US011556788B2

(12) United States Patent
Chaudhury et al.

(10) Patent No.: US 11,556,788 B2
(45) Date of Patent: Jan. 17, 2023

(54) TEXT-BASED RESPONSE ENVIRONMENT ACTION SELECTION

(71) Applicant: International Business Machines Corporation, Armonk, NY (US)

(72) Inventors: Subhajit Chaudhury, Kawasaki (JP); Daiki Kimura, Tokyo (JP); Michiaki Tatsubori, Oiso (JP); Asim Munawar, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/901,040

(22) Filed: Jun. 15, 2020

(65) Prior Publication Data

US 2021/0390387 A1 Dec. 16, 2021

(51) Int. Cl.
*G06F 40/00* (2020.01)
*G06N 3/08* (2006.01)
*G06F 40/20* (2020.01)
*G06F 40/16* (2020.01)

(52) U.S. Cl.
CPC ............. *G06N 3/08* (2013.01); *G06F 40/16* (2020.01); *G06F 40/20* (2020.01)

(58) Field of Classification Search
CPC .................................. G06F 40/20; G06F 40/16
See application file for complete search history.

(56) References Cited

U.S. PATENT DOCUMENTS

| 9,536,191 | B1 | 1/2017 | Arel et al. | |
| 10,115,055 | B2 * | 10/2018 | Weiss | G06N 3/0445 |
| 10,573,295 | B2 * | 2/2020 | Zhou | G06N 3/084 |
| 10,594,757 | B1 * | 3/2020 | Shevchenko | H04L 67/306 |

(Continued)

OTHER PUBLICATIONS

"ConceptNet Numberbatch", GitHub—commonsense/conceptnet-numberbatch. Printed May 18, 2020, 7 pages, <https://github.com/commonsense/conceptnet-numberbatch>.

(Continued)

*Primary Examiner* — Scott T Baderman
*Assistant Examiner* — Barbara M Level
(74) *Attorney, Agent, or Firm* — Edward J. Wixted, III (57) ABSTRACT

In an approach, a processor trains a model, via a reinforcement learning process, to produce a first action function for relating states of a natural language based response environment to actions applicable to the natural language based response environment. A processor retrains the model, via the reinforcement learning process, to produce a second action function, including iterations of: applying the first action function to a current state representation of the natural language based response environment to obtain a ground-truth action representation, emphasizing a word of the current state representation based on relevancy to the ground-truth action representation to obtain a modified state representation, applying a model to the modified state representation to obtain an untrained action representation, and submitting the untrained action representation to a natural language based response environment to obtain a subsequent state representation, where the subsequent state representation becomes the current state representation for a subsequent iteration.

18 Claims, 5 Drawing Sheets

(56) References Cited

U.S. PATENT DOCUMENTS

| | | | | |
|---|---|---|---|---|
| 11,151,325 | B2* | 10/2021 | Turkkan | G06F 16/3347 |
| 2019/0114569 | A1* | 4/2019 | Palmer, II | G06Q 30/0279 |
| 2019/0124020 | A1* | 4/2019 | Bobbarjung | G06F 16/958 |
| 2020/0020319 | A1* | 1/2020 | Malhotra | G10L 15/26 |
| 2020/0034737 | A1* | 1/2020 | Munro | G06F 16/24532 |
| 2020/0241878 | A1* | 7/2020 | Chandak | G06F 9/4806 |
| 2020/0356855 | A1* | 11/2020 | Yeh | G06N 3/08 |
| 2021/0097140 | A1* | 4/2021 | Chatterjee | G06N 5/022 |
| 2021/0303798 | A1* | 9/2021 | Duong | G06F 16/3329 |
| 2021/0304733 | A1* | 9/2021 | Jalaluddin | G10L 15/05 |

OTHER PUBLICATIONS

"State aware Text Analytics", Disclosed Anonymously, An IP.com Prior Art Database Technical Disclosure, IP.com No. IPCOM000236364D, IP.com Electronic Publication Date: Apr. 22, 2014, 4 pages, <https://priorart.ip.com/IPCOM/000236364>.

Ammanabrolu et al., "Playing Text-Adventure Games with Graph-Based Deep Reinforcement Learning", Proceedings of the 2019 Conference of the North American Chapter of the Association for Computational Linguistics: Human Language Technologies, vol. 1 (Long and Short Papers), Minneapolis, Minnesota, Jun. 2-Jun. 7, 2019, pp. 3557-3565, <https://www.aclweb.org/anthology/N19-1358.pdf>.

Fulda et al., "What can you do with a rock? affordance extraction via word embeddings", arXiv preprint arXiv:1703.03429, Mar. 9, 2017, 7 pages.

He et al., "Deep reinforcement learning with a natural language action space", arXivpreprint arXiv:1511.04636, Jun. 8, 2016, 15 pages.

McIntosh, Jason, "A brief history of text-based games and open source: Learn how open source has fostered the growth and development of interactive fiction", Opensource.com, Jul. 20, 2018, 13 pages, <https://opensource.com/article/18/7/interactive-fiction-tools>.

Narasimhan et al., "Language understanding for text-based games using deep reinforcement learning", Proceedings of the 2015 Conference on Empirical Methods in Natural Language Processing, Sep. 2015, Lisbon, Portugal, 11 pages.

Nottingham, Kolby, "Reinforcement Learning in Text-Based Games", Medium.com Published Jun. 12, 2019, 11 pages, <https://medium.com/voice-tech-podcast/reinforcement-learning-in-text-based-games-f9ddad9e87fd>.

Speer et al., "ConceptNet 5.5: An Open Multilingual Graph of General Knowledge", arXiv:1612.03975v2, Dec. 11, 2018, 9 pages.

Yuan et al., "Counting to explore and generalize in text-based games", Proceedings of the European Workshop on Reinforcement Learning 14 (2018), Oct. 1-3, 2018, Lille, France, 16 pages.

Yuan, Xindgi, "TextWorid-Coin-Collector", GitHub—xingdi-eric-yuan/TextWorld-Coin-Collector: Coin collector, Printed May 18, 2020, 3 pages, <https://github.com/xingdi-eric-yuan/TextWorld-Coin-Collector>.

Zahavy et al., "Learn what not to learn: Action elimination with deep reinforcement learning" Proceedings of the 32nd Conference on Neural Information Processing Systems (NeurIPS 2018), Montreal, Canada, Dec. 2-8, 2018, 17 pages.

* cited by examiner

TEXT-BASED RESPONSE ENVIRONMENT ACTION SELECTION

BACKGROUND

The present invention relates generally to the field of text-based response environment action selection, and more particularly to retraining a model for text-based response environment action selection using modified state representation.

Text-based response environments, such as games, voice assistants, etc., are becoming more popular. These environments operate purely on natural language for both input and output. This is both a limitation in state space, because each state is only partially observable, and an action space that may be seemingly unlimited.

While text-based games were popular years ago, voice assistants are actively being used and developed to interact with users through speech alone.

SUMMARY

Aspects of an embodiment of the present invention disclose a method, computer program product, and computer system. A processor trains a model, via a reinforcement learning process, to produce a first action function for relating states of a natural language based response environment to actions applicable to the natural language based response environment. A processor retrains the model, via the reinforcement learning process, to produce a second action function for relating states of the natural language based response environment to actions applicable to the natural language based response environment, the retraining including iterations of: applying the first action function to a current state representation of the natural language based response environment to obtain a ground-truth action representation, emphasizing one or more words of the current state representation based on relevancy to the ground-truth action representation to obtain a modified state representation, applying a model to the modified state representation to obtain an untrained action representation, and submitting the untrained action representation to a natural language based response environment to obtain a subsequent state representation, where the subsequent state representation becomes the current state representation for a subsequent iteration.

DETAILED DESCRIPTION

Hereinafter, example embodiments of the present invention will be described. The example embodiments shall not limit the invention according to the claims, and the combinations of the features described in the embodiments are not necessarily essential to the invention.

Embodiments of the present invention may seek to improve the action selection policy used in text-based response environments. As used herein, a text-based response environment also includes natural language environments such as virtual assistants. An action selection policy can be thought of as a relationship between "states" of the environment and "actions" to take in response to the state. It is usually the goal of an action selection policy to maximize the "reward", which is any benefit derived from taking the action, usually measured by comparing the state before the action is taken to the state after the action is taken. In some embodiments, the state includes the current context and the previous action(s).

For example, a text-based response environment may output a state s from a state space S. An action selection policy $\pi$ may then determine to take an action a from an action space A. Upon taking action a, a reward r is obtained, and a new state s' is entered. As this process repeats a trajectory emerges:

$$\varphi_{\pi,i}{}^s = (s_1,a_1,s_2,r_1)_1, (s_2,a_2,s_3,r_2)_2, \ldots (s_i,a_i,s_{i+1},r_i)_i$$

The goal of the action selection policy is to maximize the reward:

$$\max\left(\sum r_i\right)$$

Action selection policies used in text-based response environments are trained using Reinforcement Learning (RL) from the natural language information only. In traditional RL, the environment may be completely observable. However, the environment of, for example, text-based games is usually only partially observable state space and has large action space to choose from. Types of RL used in training of action selection policies include Long Short-Term Memory Deep Q-Network (LSTM-DQN) training and Deep Recursive Residual Network (DRRN) training, which have been successful in mitigating the problems associated with a large action space. However, the resulting action selection policies from these models become easily "overfit" to the text-based response environments used during training. The amount of environments required to avoid overfitting, i.e.—to acceptably perform in a new unseen environment, is magnitudes higher than the amount of environments required to acceptably perform in the training environments.

Embodiments of the present invention understand that the states output by text-based response environments include words that are unnecessary to determine an appropriate action. However, during training, a model may learn to associate a response with an unnecessary or unrelated term. This allows the model to perform well in that particular environment, but not in new unseen environments. A model in this condition can be referred to as "overfit". Only upon training the model in sufficiently diverse environments will the model learn to ignore the unnecessary and unrelated terms. Embodiments of the present invention have found ways to emphasize the words of a state that are necessary or related to the appropriate action. For example, unrelated or unnecessary words may be removed from a state, or replaced with random words.

Figure 1:
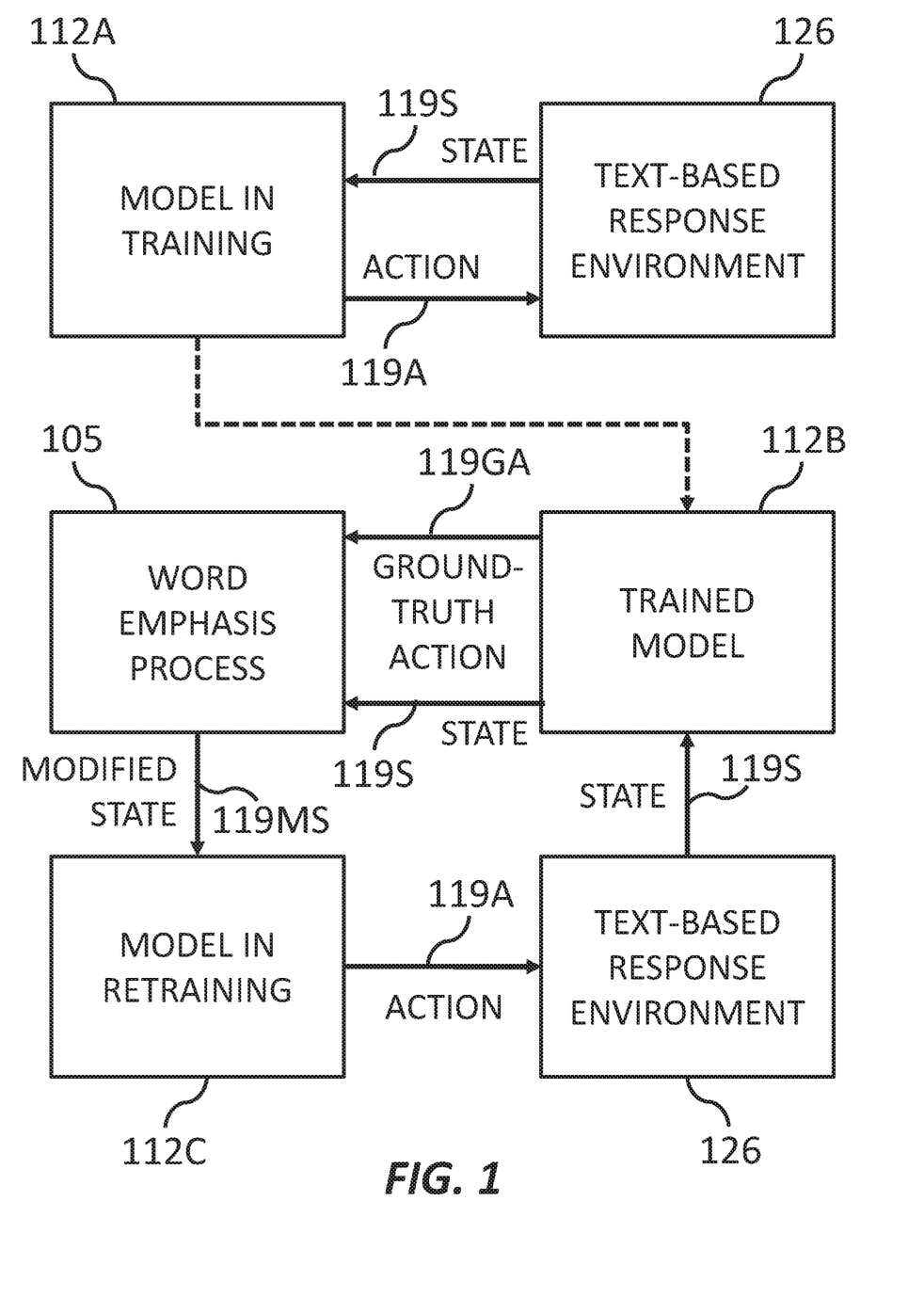
FIG. 1 shows a diagram of the interaction of retraining a model for text-based response environment action selection and emphasizing words in state representations, according to an embodiment of the present invention.

FIG. 1 shows a diagram of the interaction of retraining a model for text-based response environment action selection and emphasizing words in state representations, according to an embodiment of the present invention. In this embodiment, model 112A is trained through reinforcement learning while interacting with text-based response environment 126. As text-based response environment 126 outputs state representations 119S, model 112A is applied to each state representation to generate an action representation 119A. Each action representation 119A is executed in text-based response environment 126 to product a subsequent state representation 119S. As this cycle is repeated during the training process, the model is updated according to a reward associated with each state representation 119S.

Once model 112A is adequately trained, and becomes trained model 112B, a retraining process can begin. During retraining, untrained model 112C, which is substantially similar to untrained model 112A before training began, is retrained using the same text-based response environment 126 using modified state representations 119MS. In order to obtain useful modified state representations 119MS, a state representation 119S is obtained from text-based response environment 126. State representation 119S may be an initial state representation or a state representation output in response to action 119A. Trained model 112B is then applied to state representation 119S to obtain ground-truth action representation 119GA. In other words, trained model 112B is assumed to output the correct action representation. A word emphasis process 105 is then applied to both the current state 119S and the ground-truth action 119GA. For example, word emphasis process 105 evaluates each word in the current state 119S in comparison to the ground-truth action 119GA, yielding a value for each word in the current state 119S. Word emphasis process 105 applies a threshold value to determine which words to emphasize.

There are many ways to emphasize the words corresponding to values that are equal to, or above, the threshold value. For example, word emphasis process 105 may remove words corresponding to values that are below the threshold value from the current state representation 119S to produce a modified state 119MS. In this manner, the modified state 119MS is assumed to include only the words that are necessary for model 112C to determine the correct action, i.e.—output the correct action representation. In some embodiments, word emphasis process 105 may instead replace words corresponding to values that are below the threshold value with random words that would also correspond to values that are below the threshold value. In this manner, although modified state 119MS still has words that are unnecessary for model 112C to determine the correct action, as training proceeds the randomness of the unnecessary words may prevent model 112C from establishing a correlation between the randomized unnecessary words and any actions.

Once the modified state representation 119MS is produced, model 112C is applied to the modified state representation 119MS instead of the state representation 119S to obtain an action 119A. Iterations of this retraining cycle are repeated until model 112C is adequately trained as measured by the performance of model 112C in text-based response environment 126. Model 112C, once trained, may be far more accurate when interacting with new text-based response environments than trained model 112B, even though model 112C may not perform any better than trained model 112B in text-based response environment 126.

In other embodiments of the retraining process, the trained model may be applied to the modified state representation before proceeding to apply the model-in-training is applied to the modified state representation to verify that the trained model will output the same ground-truth action representation when applied to the modified state representation.

Figure 2:
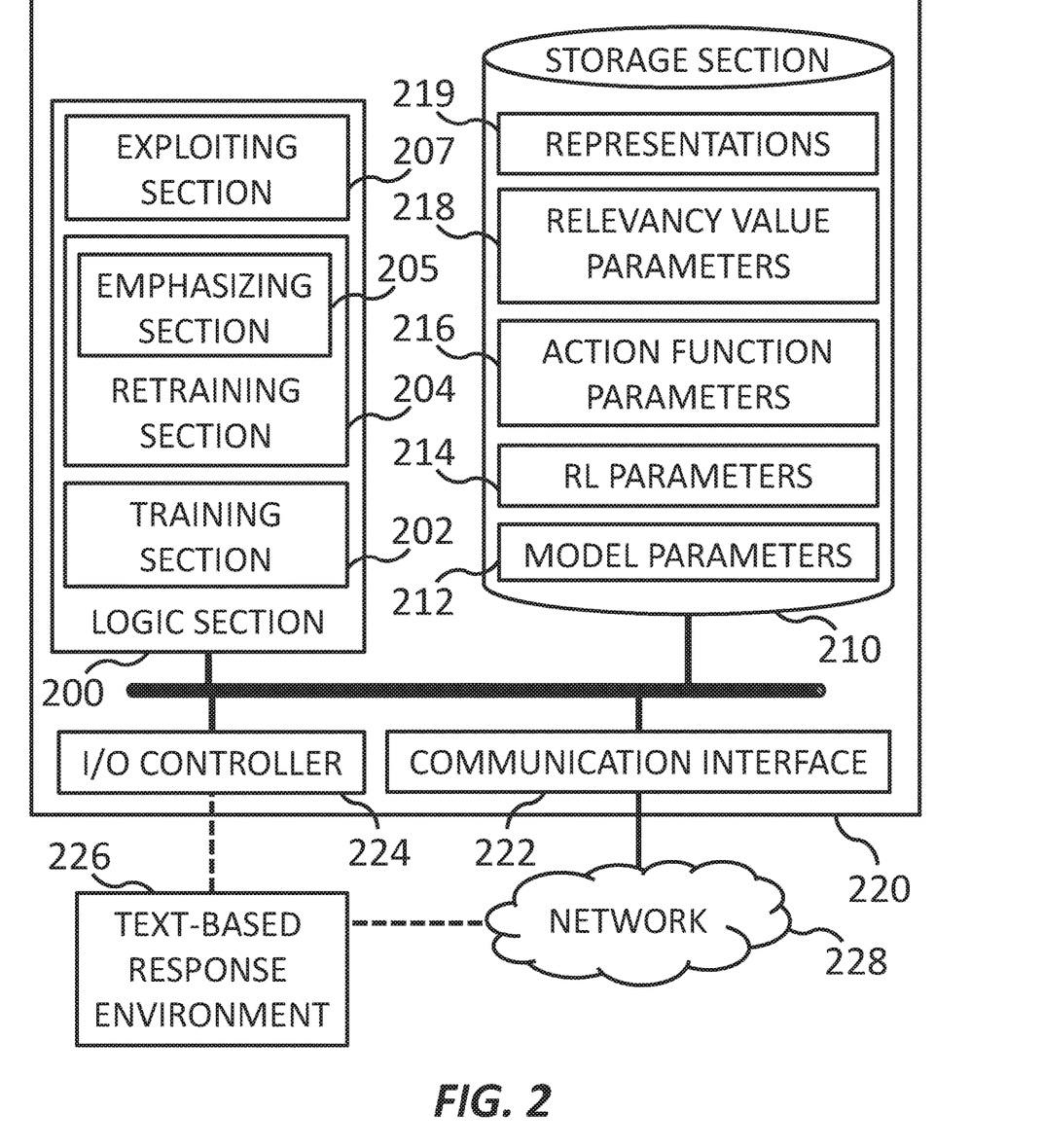
FIG. 2 shows an exemplary hardware configuration for retraining a model for text-based response environment action selection, according to an embodiment of the present invention.

FIG. 2 shows an exemplary hardware configuration for retraining a model for text-based response environment action selection, according to an embodiment of the present invention. The exemplary hardware configuration includes apparatus 220, which communicates with network 228, and interacts with text-based response environment 226. Apparatus 220 may be a host computer such as a server computer or a mainframe computer that executes an on-premise application and hosts client computers that use it, in which case apparatus 220 may not be directly connected to text-based response environment 226, but are connected through a terminal device through network 228. Apparatus 220 may be a computer system that includes two or more computers. Apparatus 220 may be a personal computer that executes an application for a user of apparatus 220.

Apparatus 220 includes a logic section 200, a storage section 210, a communication interface 222, and an input/output controller 224. Logic section 200 may be a computer program product including one or more computer readable storage mediums collectively storing program instructions that are executable by a processor or programmable circuitry to cause the processor or programmable circuitry to perform the operations of the various sections. Logic section 200 may alternatively be analog or digital programmable circuitry, or any combination thereof. Logic section 200 may be composed of physically separated storage or circuitry that interacts through communication. Storage section 210 may be a non-volatile computer-readable medium capable of storing non-executable data for access by logic section 200 during performance of the processes herein. Communication interface 222 reads transmission data, which may be stored on a transmission buffering region provided in a recording medium, such as storage section 210, and transmits the read transmission data to network 228 or writes reception data received from network 228 to a reception buffering region provided on the recording medium. Input/output controller 224 connects to various input and output units, such as text-based response environment 226, via a parallel port, a serial port, a keyboard port, a mouse port, a monitor port, and the like to accept commands and present information.

Logic section 200 includes training section 202 and retraining section 204, which includes emphasizing section 205. Storage section 210 includes model parameters 212, RL parameters 214, action function parameters 216, and relevancy value parameters 218, and representations 219.

Training section 202 is the portion of logic section 200 that performs training of models for text-based response environment action selection. For example, training section may be configured to train a model via a reinforcement learning process to produce a first action function for relating states of a text-based response environment to actions applicable to the text-based response environment. While performing training, training section 202 may access model parameters 212, RL parameters 214, and representations 219. Training section 202 may include sub-sections for performing additional functions, as described in the flow charts below. Such sub-sections may be referred to by a name associated with their function.

Retraining section 204 is the portion of logic section 200 that retrains models for text-based response environment action selection. For example, a retraining section may be configured to perform a retraining process to retrain the model via the reinforcement learning process to produce a second action function for relating states of the text-based response environment to actions applicable to the text-based response environment. While performing retraining, retraining section 204 may access model parameters 212, RL parameters 214, action function parameters 216, relevancy value parameters, and representations 219. Retraining section 204 may include sub-sections for performing additional functions, as described in the flow charts below. Such sub-sections may be referred to by a name associated with their function.

Emphasizing section 205 is the portion of logic section 200 that emphasizes words of a state representation that are relevant to a ground-truth action representation in the course of retraining of models for text-based response environment action selection. For example, emphasizing section may be configured to emphasize one or more words of a current state representation based on relevancy to a ground-truth action representation to obtain a modified state representation. Depending on the embodiment, emphasizing section may remove words that are not relevant to the ground-truth action representation, replace such words with randomized words, or emphasize the one or more words in another way. Emphasizing section 205 may include sub-sections for performing additional functions, as described in the flow charts below. Such sub-sections may be referred to by a name associated with their function.

In other embodiments, the apparatus may be any other device capable of processing logical functions in order to perform the processes herein. The text-based response environment may be any device capable of conveying information to a user from the apparatus, and accepting user input to the apparatus, such as conveying state representations and accepting user actions to perform retraining of models for text-based response environment action selection. The apparatus may not need to be connected to a network in environments where the input, output, and all information is directly connected. The logic section and the storage section need not be entirely separate devices, but may share one or more computer-readable mediums. For example, the storage section may be a hard drive storing both the computer-executable instructions and the data accessed by the logic section, and the logic section may be a combination of a central processing unit (CPU) and random access memory (RAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Figure 3:
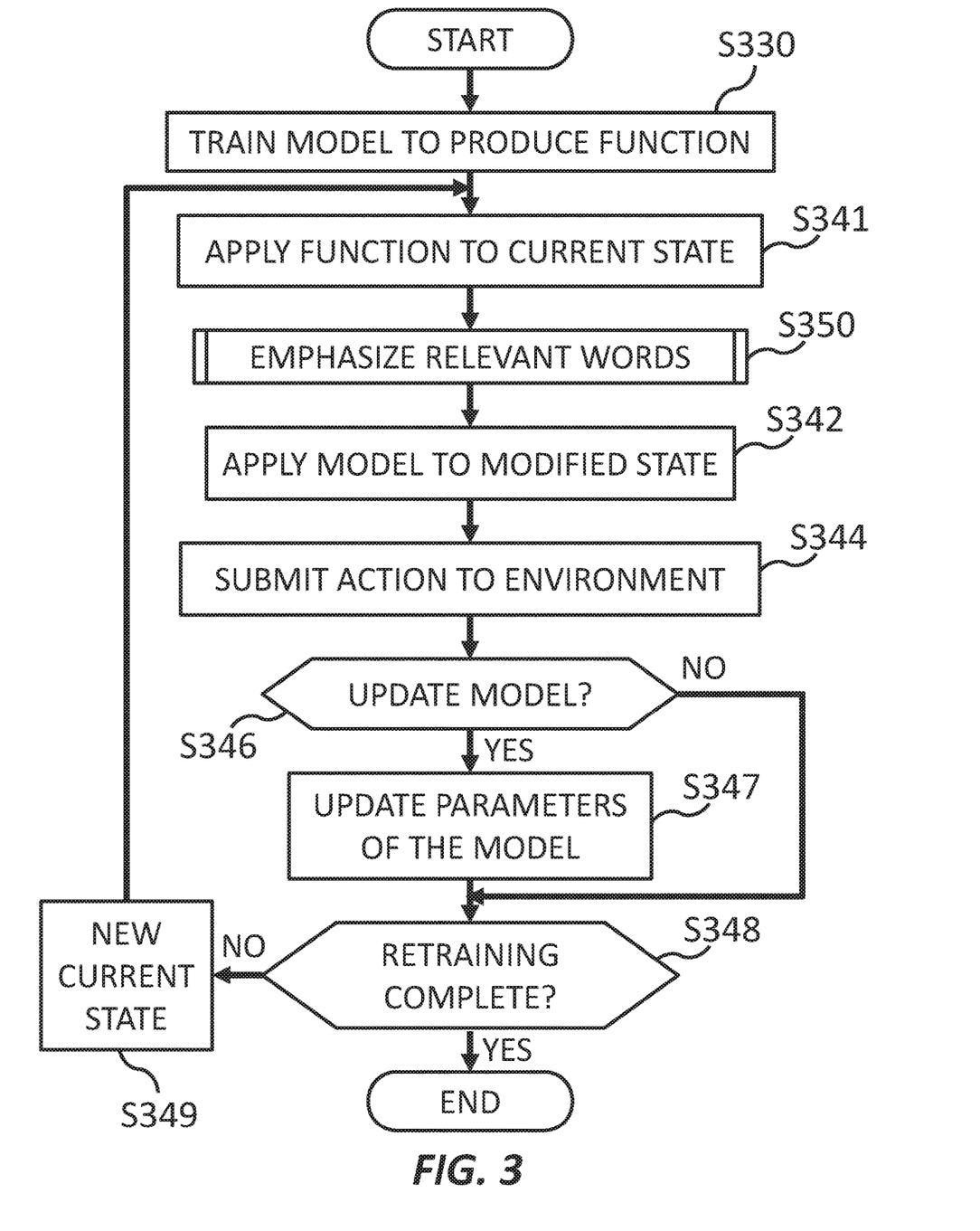
FIG. 3 shows an operational flow for retraining a model for text-based response environment action selection, according to an embodiment of the present invention.

FIG. 3 shows an operational flow for retraining a model for text-based response environment action selection, according to an embodiment of the present invention. The operational flow may provide a method of retraining a model for text-based response environment action selection.

At S330, a training section, such as training section 202, trains a model, such as model 112A, for text-based response environment action selection. For example, the training section performs an operation of training a model via a reinforcement learning process to produce a first action function for relating states of a text-based response environment to actions applicable to the text-based response environment. Examples of the reinforcement learning process include Long Short-Term Memory Deep Q-Network (LSTM-DQN) training, Deep Recursive Residual Network (DRRN) training, etc. An adequately trained model may be referred to as an action function.

Operations S341-S349 constitute a retraining process. In the retraining process, a retraining section, such as retraining section 204, retrains the model for text-based response environment action selection. For example, the retraining section retrains the model via the reinforcement learning process to produce a second action function for relating states of the text-based response environment to actions applicable to the text-based response environment, the retraining including iterations of operations S341-349. Before the iterations, the retraining section obtains an initial state representation from the text-based response environment, the initial state representation used as the current state representation for the first iteration.

At S341, an applying section, such as retraining section 204 or a sub-section thereof, applies the action function to a current state representation of a text-based response environment. The current state representation of the text-based response environment may be an initial state representation of the text-based response environment or a state representation output in response to submission of an action. By applying the action function to the current state representation, an action representation may be obtained. Since the action function is adequately trained, the action representation obtained can be assumed to represent the correct action, and may be referred to as a ground-truth action representation. For example, the applying section may apply the first action function to a current state representation of the text-based response environment to obtain a ground-truth action representation. In some embodiments, the current state representation includes an untrained action representation from the previous iteration.

At S350, an emphasizing section, such as emphasizing section 205, emphasizes the relevant words of the current state representation based on the ground-truth action representation. For example, the emphasizing section emphasizes one or more words of the current state representation based on relevancy to the ground-truth action representation to obtain a modified state representation.

At S342, the applying section applies a model, such as model 112C, to the modified state representation. For example, the applying section applies a model to the modified state representation to obtain an untrained action representation. The model being retrained is substantially similar if not identical in structure to the action function, except that the parameters have been reset for the retraining process.

At S344, a submitting section, such as retraining section 204 or a sub-section thereof, submits the untrained action representation to the text-based response environment. For example, the submitting section submits the untrained action representation to the text-based response environment to obtain a subsequent state representation.

At S346, the retraining section determines whether to update the parameters of the model. The parameters of the model must be updated during the retraining process in order to produce an effective function for action selection. However, it is not always necessary to update the parameters in every iteration. If the retraining section determines to update the parameters, then the operational flow proceeds to S347.

If the retraining section determines not to update the parameters in this iteration, then the operational flow proceeds to S348.

At S347, an updating section, such as retraining section 204 or a sub-section thereof, updates the parameters of the model. For example, the updating section updates the parameters of the model according to the reinforcement learning process. For embodiments in which the model is a neural network, updating the parameters may include adjusting weights and/or biases of the network.

At S348, the retraining section determines whether the retraining process is complete. For example, the retraining section may determine that the retraining process is complete in response to a designated number of iterations having been performed, a consistently high reward, or any other indication that the model has been adequately retrained. If the retraining section determines that retraining is not yet complete, then the operational flow proceeds to S349, where the subsequent state representation output from the text-based response environment at S344 becomes the current state representation before returning to S341 for another iteration. In other words, the subsequent state representation becomes the current state representation for the next iteration. If the retraining section determines that retraining is complete, then the operational flow ends.

Although the training and retraining processes in the operational flow of FIG. 3 uses only one text-based response environment, many text-based response environments may be used. The optimal number of text-based response environments to use depends on the complexity of the environments. However, if too many text-based response environments are used, then the retraining process may not increase the effectiveness of the action selection function. The retraining may greatly improve the effectiveness of an action selection function trained using relatively few text-based response environments.

Figure 4:
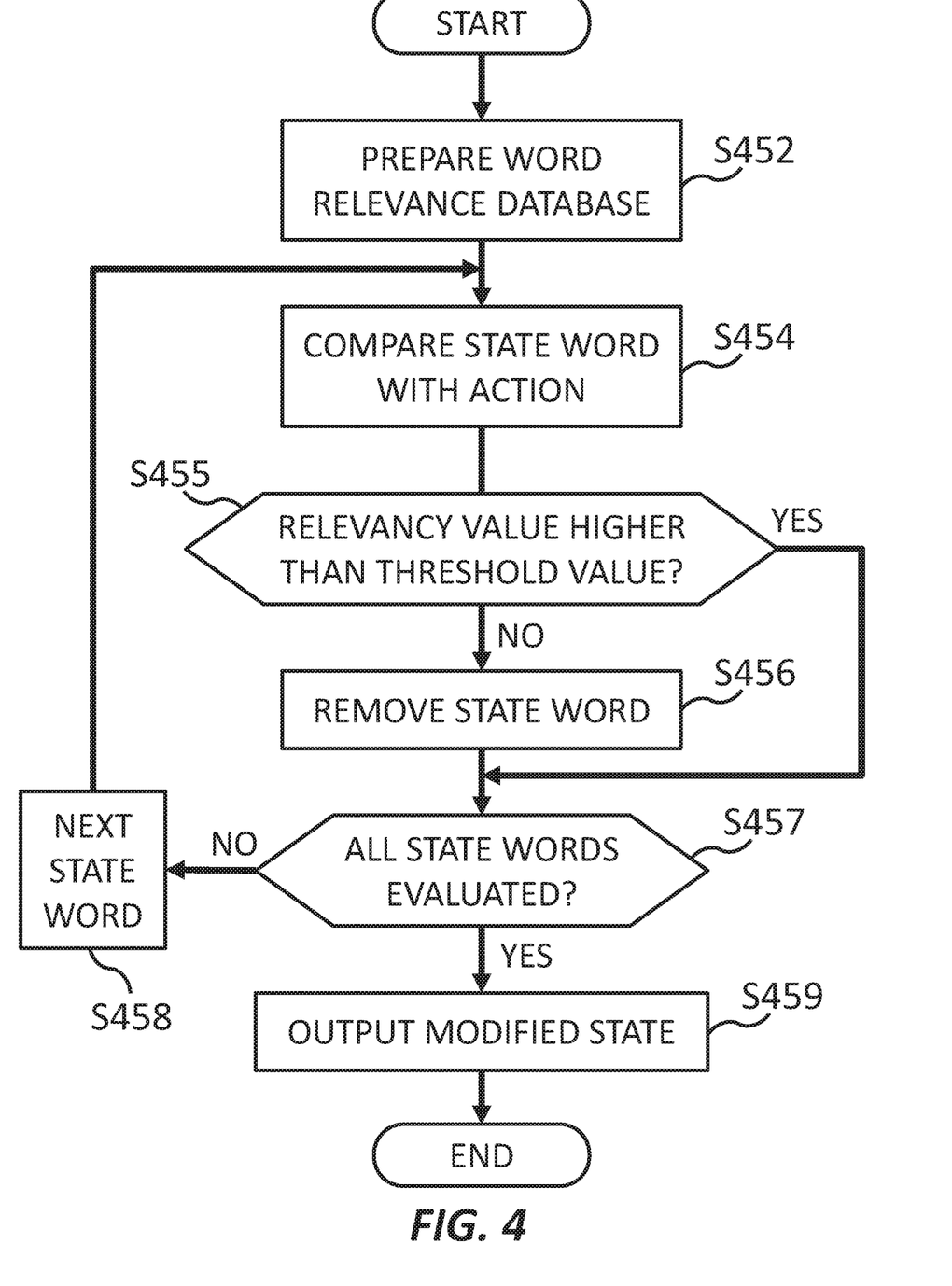
FIG. 4 shows an operational flow for emphasizing relevant words of a state representation, according to an embodiment of the present invention.

FIG. 4 shows an operational flow for emphasizing relevant words of a state representation, such as in S350 of FIG. 3, according to an embodiment of the present invention. The operations within this operational flow may be performed by an emphasizing section, such as emphasizing section 205, or a correspondingly named sub-section thereof. As described in FIG. 3, the current state representation and the ground-truth action representation are obtained prior to emphasizing one or more words of the current state representation.

At S452, a preparation section, such as emphasizing section 205 or a sub-section thereof, prepares a word relevance database, such as a database of word embeddings indicating the relationship of each word in the database to each other word. For example, the preparing section may obtain a precomputed database of word embeddings, or may generate a proprietary database of word embeddings.

At S454, a comparing section, such as emphasizing section 205 or a sub-section thereof, compares a word in the state representation with the ground-truth action representation. For example, as iterations proceed, the comparing section uses the database of word relevance to determine a relevancy value for each word in the current state representation. An example of the comparison algorithm is:

$$S_i = \frac{1}{N} \sum S_{concept}(w_{act}^j, w_{state}^i)$$

In the above equation, $w_{act}^j$ represents the j-th word in the ground-truth action representation, $w_{state}^i$ represents the i-th word in the state representation, S concept represents the similarity score of the j-th word in the ground-truth action representation and the i-th word in the state representation, N represents the number of words in the ground-truth action representation, and $S_i$ represents the relevancy value, which in this example is the average similarity score of the i-th word in the state representation and the words of the ground-truth action representation.

At S455, the emphasizing section determines whether the relevancy value of the word in the current state representation is higher than a threshold value. If the emphasizing section determines that the relevancy value of the word in the current state representation is not higher than a threshold value, then the operational flow proceeds to S456. If the emphasizing section determines that the relevancy value of the word in the current state representation is higher than a threshold value, then the operational flow proceeds to S457. In the example comparison algorithm above, the determination at S455 is:

$$S_i > th$$

In the above equation, th is the threshold value.

At S456, a removing section, such as emphasizing section 205 or a sub-section thereof, removes the word from the current state representation. For example, as iterations proceed, the removing section removes all words except for each of the one or more words that has a relevancy value that is greater than the threshold value.

At S457, the emphasizing section determines whether all of the words in the current state representation have been evaluated. If the emphasizing section determines that all the words of the current state representation have not yet been evaluated, then the operational flow proceeds to S458, where another word from the current state representation is selected for evaluation before returning to S454 for another iteration. As iterations proceed, S458 selects only previously unselected words, so that all of the words will be selected. If the emphasizing section determines that all the words of the current state representation have been evaluated, then the operational flow proceeds to S459, where a modified state representation is output, the modified state representation including only the one or more words that have a relevancy value that is greater than the threshold value, before the operational flow ends.

In the embodiment of FIG. 4, the modified state representation includes only the one or more words that have a relevancy value higher than the threshold value, and all other words are removed. However, in other embodiments, the emphasizing includes replacing all words except for the one or more words with one or more random words. Although each word is evaluated individually, other embodiments may utilize different forms of tokenization to determine when it is more appropriate to evaluate a single word, two neighboring words, a phrase, etc. In further embodiments, the emphasizing includes assigning weights to each word in the state representation. In such embodiments, the weight may be proportional to the relevancy value, and a threshold value may still be used to remove words having a low relevancy value.

The threshold value may be fixed for the entire retraining procedure. However, if the action selection function that results from the retraining process does not perform adequately, then the retraining process may be repeated using a different threshold value.

Figure 5:
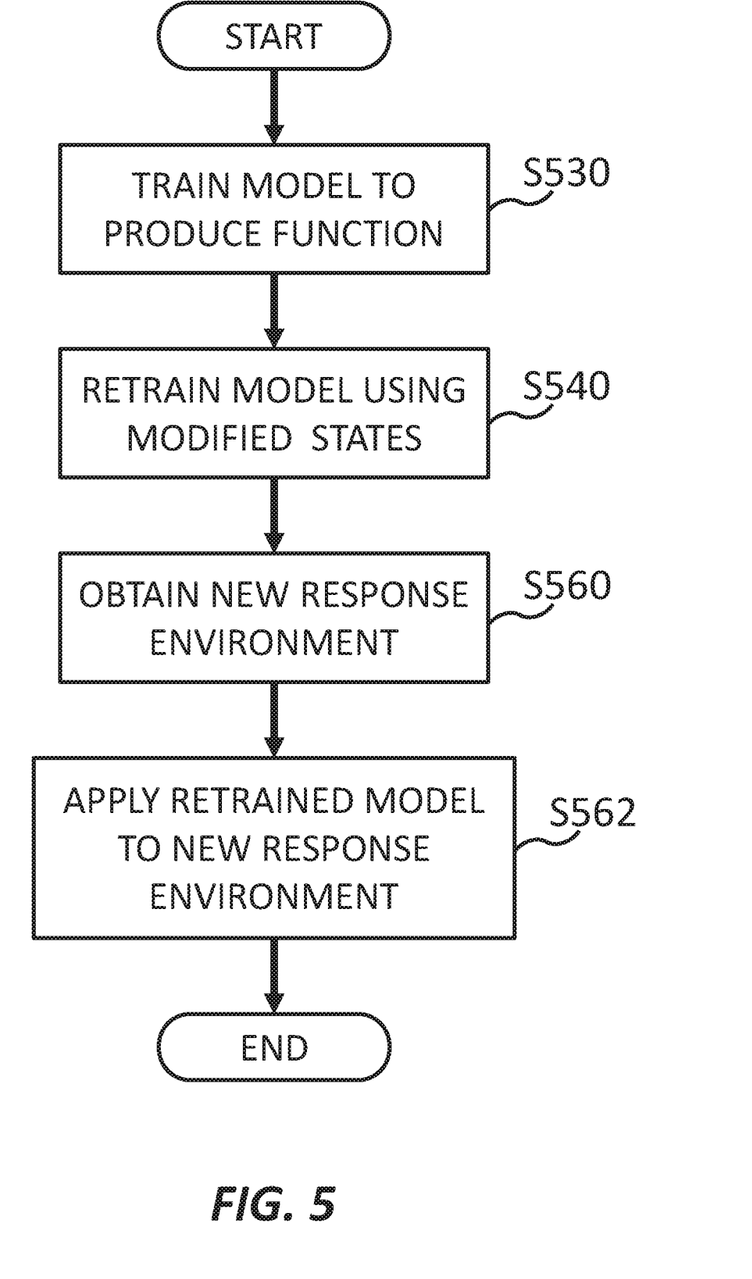
FIG. 5 shows an operational flow for training a model for a new text-based response environment, according to an embodiment of the present invention.

FIG. 5 shows an operational flow for training a model for a new text-based response environment, according to an embodiment of the present invention.

At S530, a training section, such as training section 202, trains a model, such as model 112A, for text-based response environment action selection. For example, the training section performs an operation of training a model via a reinforcement learning process to produce a first action function for relating states of a text-based response environment to actions applicable to the text-based response environment.

At S540, a retraining section, such as retraining section 204, retrains the model for text-based response environment action selection. For example, the retraining section retrains the model via the reinforcement learning process to produce a second action function for relating states of the text-based response environment to actions applicable to the text-based response environment.

At S560, an obtaining section, such as exploiting section 207 or a sub-section thereof, obtains a new text-based response environment. For example, the obtaining section obtains a text-based response environment that was not used during training or retraining of the model. The new text-based response environment may be of the same type, class, or genre as the text-based response environment used during training and retraining.

At S562, an applying section, such as exploiting section 207 or a sub-section thereof, applies the retrained model, also referred to as an action function, to the new text-based response environment to achieve the desired benefit with confidence that the retrained model will be able to properly respond to state representations of the new text-based response environment even if the retrained model has never encountered the new text-based response environment before.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Many of the embodiments of the present invention include artificial intelligence, models, and neural network models in particular. Some of the foregoing embodiments describe specific types of neural networks. However, a neural network usually starts as a configuration of random values. Such untrained neural networks must be trained before they can be reasonably expected to perform a function with success. Many of the processes described herein are for the purpose of training neural networks for action selection. Once trained, a neural network can be used for action selection, and may not require further training. In this way, a trained neural network is a product of the process of training an untrained neural network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
    training a model, via a reinforcement learning process, to produce a first action function for relating states of a natural language based response environment to actions applicable to the natural language based response environment; and
    retraining the model, via the reinforcement learning process, to produce a second action function for relating states of the natural language based response environment to actions applicable to the natural language based response environment, the retraining including iterations of:
    applying the first action function to a current state representation of the natural language based response environment to obtain a ground-truth action representation,
    emphasizing one or more words of the current state representation based on relevancy to the ground-truth action representation to obtain a modified state representation, wherein the emphasizing includes replacing all words, excluding the one or more words, with one or more random words,
    applying a model to the modified state representation to obtain an untrained action representation, and
    submitting the untrained action representation to a natural language based response environment to obtain a subsequent state representation, wherein the subsequent state representation becomes the current state representation for a subsequent iteration.

2. The computer-implemented method of claim 1, wherein emphasizing the one or more words of the current state representation includes accessing a word relevance database to determine a relevancy value for each word in the current state representation.

3. The computer-implemented method of claim 2, wherein each of the one or more words has a relevancy value that is greater than a threshold value.

4. The computer-implemented method of claim 1, wherein emphasizing the one or more words of the current state representation includes removing all words except for the one or more words.

5. The computer-implemented method of claim 1, wherein retraining the model further comprises, prior to performing the iterations, obtaining an initial state representation from the natural language based response environment, the initial state representation used as the current state representation for a first iteration.

6. The computer-implemented method of claim 1, further comprising:
obtaining a new natural language based response environment;
applying the second action function to state representations of the new text-based response environment.

7. The computer-implemented method of claim 1, wherein the current state representations include the untrained action representation from the previous iteration.

8. A computer program product comprising:
one or more computer readable storage media, and program instructions collectively stored on the one or more computer readable storage media, the program instructions comprising:
program instructions to train a model, via a reinforcement learning process, to produce a first action function for relating states of a natural language based response environment to actions applicable to the natural language based response environment; and
program instructions to retrain the model, via the reinforcement learning process, to produce a second action function for relating states of the natural language based response environment to actions applicable to the natural language based response environment, the program instructions to retrain including iterations of:
program instructions to apply the first action function to a current state representation of the natural language based response environment to obtain a ground-truth action representation,
program instructions to emphasize one or more words of the current state representation based on relevancy to the ground-truth action representation to obtain a modified state representation, wherein the emphasizing includes replacing all words, excluding the one or more words, with one or more random words,
program instructions to apply a model to the modified state representation to obtain an untrained action representation, and
program instructions to submit the untrained action representation to a natural language based response environment to obtain a subsequent state representation, wherein the subsequent state representation becomes the current state representation for a subsequent iteration.

9. The computer program product of claim 8, wherein program instructions to emphasize the one or more words of the current state representation include program instructions to access a word relevance database to determine a relevancy value for each word in the current state representation.

10. The computer program product of claim 9, wherein each of the one or more words has a relevancy value that is greater than a threshold value.

11. The computer program product of claim 8, wherein program instructions to emphasize the one or more words of the current state representation include program instructions to remove all words except for the one or more words.

12. The computer program product of claim 8, wherein program instructions to retrain the model further comprise program instructions to, prior to performing the iterations, obtain an initial state representation from the natural language based response environment, the initial state representation used as the current state representation for a first iteration.

13. The computer program product of claim 8, further comprising:
program instructions, collectively stored on the one or more computer readable storage media, to obtain a new natural language based response environment;
program instructions, collectively stored on the one or more computer readable storage media, to apply the second action function to state representations of the new text-based response environment.

14. The computer program product of claim 8, wherein the current state representations include the untrained action representation from the previous iteration.

15. A computer system comprising:
one or more computer processors, one or more computer readable storage media, and program instructions collectively stored on the one or more computer readable storage media for execution by at least one of the one or more computer processors, the program instructions comprising:
program instructions to train a model, via a reinforcement learning process, to produce a first action function for relating states of a natural language based response environment to actions applicable to the natural language based response environment; and
program instructions to retrain the model, via the reinforcement learning process, to produce a second action function for relating states of the natural language based response environment to actions applicable to the natural language based response environment, the program instructions to retrain including iterations of:
program instructions to apply the first action function to a current state representation of the natural language based response environment to obtain a ground-truth action representation,
program instructions to emphasize one or more words of the current state representation based on relevancy to the ground-truth action representation to obtain a modified state representation, wherein the emphasizing includes replacing all words, excluding the one or more words, with one or more random words,
program instructions to apply a model to the modified state representation to obtain an untrained action representation, and
program instructions to submit the untrained action representation to a natural language based response environment to obtain a subsequent state representation, wherein the subsequent state representation becomes the current state representation for a subsequent iteration.

16. The computer system of claim 15, wherein program instructions to emphasize the one or more words of the current state representation include program instructions to access a word relevance database to determine a relevancy value for each word in the current state representation.

17. The computer system of claim 16, wherein each of the one or more words has a relevancy value that is greater than a threshold value.

18. The computer system of claim 15, wherein program instructions to emphasize the one or more words of the current state representation include program instructions to remove all words except for the one or more words.

* * * * *